US011930331B2

(12) United States Patent
Zhang

(10) Patent No.: US 11,930,331 B2
(45) Date of Patent: Mar. 12, 2024

(54) METHOD, APPARATUS AND DEVICE FOR PROCESSING SOUND SIGNALS

(71) Applicant: GOERTEK INC., Shandong (CN)

(72) Inventor: Xiaohong Zhang, Shandong (CN)

(73) Assignee: Goertek, Inc., Shandong (CN)

( * ) Notice: Subject to any disclaimer, the term of this patent is extended or adjusted under 35 U.S.C. 154(b) by 281 days.

(21) Appl. No.: 17/433,027

(22) PCT Filed: Sep. 29, 2019

(86) PCT No.: PCT/CN2019/108944
§ 371 (c)(1),
(2) Date: Aug. 23, 2021

(87) PCT Pub. No.: WO2020/237955
PCT Pub. Date: Dec. 3, 2020

(65) Prior Publication Data

US 2022/0159376 A1 May 19, 2022

(30) Foreign Application Priority Data

May 31, 2019 (CN) ......................... 201910471999.0

(51) Int. Cl.
*H04R 3/00* (2006.01)
*H04R 1/40* (2006.01)
*H04R 29/00* (2006.01)

(52) U.S. Cl.
CPC ............. *H04R 3/005* (2013.01); *H04R 1/406* (2013.01); *H04R 29/005* (2013.01); *H04R 2410/01* (2013.01)

(58) Field of Classification Search
CPC ...... H04R 3/005; H04R 1/406; H04R 29/005; H04R 2410/01
See application file for complete search history.

(56) References Cited

FOREIGN PATENT DOCUMENTS

| | | | |
|---|---|---|---|
| CN | 110267160 A | | 9/2019 |
| JP | 2005070643 A | * | 3/2005 |

OTHER PUBLICATIONS

Machine translation of JP2005070643A Mar. 17, 2005.*

* cited by examiner

*Primary Examiner* — Andrew L Sniezek
(74) *Attorney, Agent, or Firm* — Baker Botts, LLP

(57) ABSTRACT

A method, an apparatus and a device for processing sound signals are provided in the present application. The method comprises: receiving a first sound signal through a first sound reception apparatus and a second sound signal through a second sound reception apparatus respectively; the first sound reception apparatus and the second sound reception apparatus have a corresponding reception delay constant therebetween; performing delay processing on the first sound signal according to the reception delay constant at each signal processing time to acquire a signal correlation coefficient between the first sound signal after the delay processing and the second sound signal; detecting whether the first sound signal and the second sound signal include a coherent noise signal according to the signal correlation coefficient between the first sound signal after the delay processing and the second sound signal; filtering out the coherent noise signal from the first sound signal and the second sound signal when the coherent noise signal is included in the first sound signal and the second sound signal to acquire and output a target sound signal at a corresponding signal processing time.

9 Claims, 5 Drawing Sheets

Sound signal processing device 1000

METHOD, APPARATUS AND DEVICE FOR PROCESSING SOUND SIGNALS

CROSS-REFERENCE TO RELATED APPLICATION

This application claims priority to Chinese Patent Application No. 201910471999.0, filed with the Chinese Patent Office on May 31, 2019 and entitled "METHOD, APPARATUS AND DEVICE FOR PROCESSING SOUND SIGNALS", the content of which is incorporated herein by reference in its entirety.

TECHNICAL FIELD

Present disclosure relates to the technical field of signal processing, more specifically to a method, an apparatus and a device for processing sound signals.

BACKGROUND OF THE INVENTION

A microphone array composed of a plurality of microphones can receive sound signals from the same sound source, and process the received sound signals with beamforming algorithm. The beamforming algorithm is mainly based on stability of a sound wave transmission speed and immobility of a relative distance between the microphones in the microphone array, and with the use of a time difference and a phase difference when a sound signal reaches two microphones, extracts the more correlated parts of the signal received by the two microphones for merging processing, and thus can realize an effect of enhancing a sound signal as well as reducing noise thereof.

However, in a transmission environment of sound signals, there is usually interference from noise sources. If there are multiple coherent noise sources with strong correlation in the transmission environment (for example, multiple channel signals with strong correlation produced when playing sound on a multi-channel sound playing device), it will bring multiple coherent noise with strong correlation to transmission of the sound signals; however in this case, when the received sound signals comprising the coherent noise are processed by the beamforming algorithm, it will be difficult to eliminate these coherent noise, resulting in poor noise reduction performance and affecting enhancement effect of the received sound signals.

SUMMARY OF THE INVENTION

An object of the present disclosure is to provide a new technical solution for processing sound signal.

According to a first aspect of present disclosure, a method for processing a sound signal is provided, comprising:

- receiving a first sound signal through a first sound reception apparatus and a second sound signal through a second sound reception apparatus respectively; the first sound reception apparatus and the second sound reception apparatus have a corresponding reception delay constant therebetween;
- performing delay processing on the first sound signal according to the reception delay constant at each signal processing time to acquire a signal correlation coefficient between the first sound signal after the delay processing and the second sound signal;
- detecting whether the first sound signal and the second sound signal include a coherent noise signal according to the signal correlation coefficient between the first sound signal after the delay processing and the second sound signal;
- filtering out the coherent noise signal from the first sound signal and the second sound signal when the coherent noise signal is included in the first sound signal and the second sound signal to acquire and output a target sound signal at a corresponding signal processing time.

According to a second aspect of present disclosure, a sound signal processing apparatus is provided, wherein, comprising:

- a signal reception unit configured to receive a first sound signal through a first sound reception apparatus and receive a second sound signal through a second sound reception apparatus respectively; the first sound reception apparatus and the second sound reception apparatus have a corresponding reception delay constant therebetween;
- a signal correlation processing unit configured to perform delay processing on the first sound signal at each signal processing time according to the reception delay constant to acquire a signal correlation coefficient between the first sound signal after the delay processing and the second sound signal;
- a coherent noise determination unit configured to determine whether the first sound signal and the second sound signal include a coherent noise signal according to the signal correlation coefficient between the first sound signal after the delay processing and the second sound signal;
- a coherent noise filtering unit configured to filter out a coherent noise signal from the first sound signal and the second sound signal when determining that the coherent noise signal is included in the first sound signal and the second sound signal to acquire and output a target sound signal at a corresponding signal processing time.

According to a third aspect of present disclosure, a sound signal processing apparatus is provided, wherein, comprising a memory and a processor, the memory is configured to store executable instructions, and the processor is configured to, according to control of the executable instructions, operate the sound signal processing apparatus to execute the method for processing sound signals provided by any one of the first aspect.

According to a forth aspect of present disclosure, a sound signal processing device is provided, wherein, comprising:

- a first sound reception apparatus configured to receive a sound signal;
- a second sound reception apparatus configured to receive a sound signal; the first sound reception apparatus and the second sound reception apparatus have a corresponding reception delay constant therebetween;
- and the sound signal processing apparatus of the second aspect or the third aspect.

According to an embodiment of the present disclosure, for two-way sound signals received by two sound reception apparatuses respectively, it can perform delay processing on one-way sound signal according to the reception delay constant between the two sound reception apparatuses, and detect whether the two-way sound signals include coherent noise signals with a signal correlation coefficient between the sound signal after the delay processing and the other-way sound signal, so as to correspondingly eliminate the coherent noise signals included in the two-way sound signals, avoid mistaking the coherent noise signals for target sound signals when performing beamforming processing on two-way sound signals and affecting noise reduction effect and sound enhancement effect that can be obtained during the sound signal processing (for example, the beamforming processing), and improve the sound signal processing performance.

Other features and advantages of present disclosure will become clear from the following detailed description of exemplary embodiments of present disclosure with reference to the accompanying drawings.

BRIEF DESCRIPTION OF THE DRAWINGS

The accompanying drawings incorporated in and constituting a part of the specification illustrate embodiments of present disclosure and together with the description thereof, serve to explain the principles of the application.

DETAILED DESCRIPTION

Figure 1:
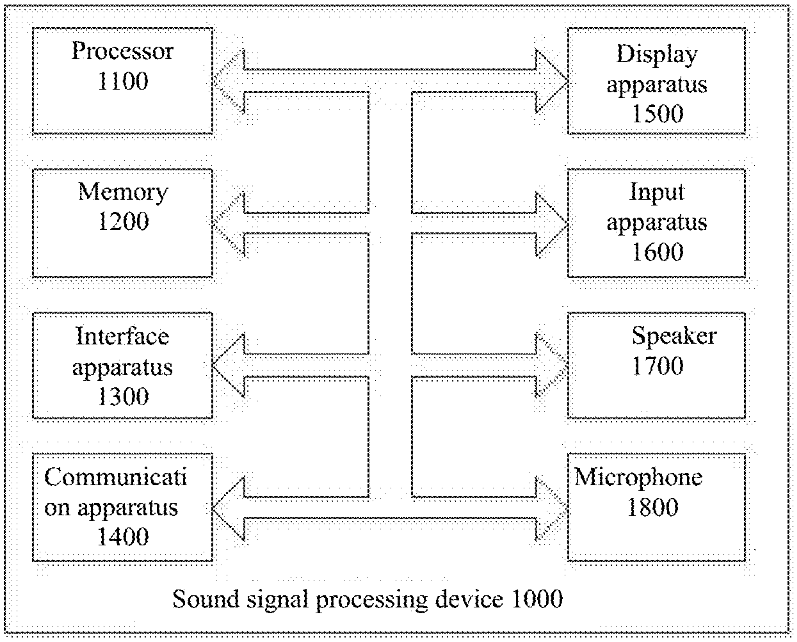
FIG. 1 is a block diagram showing an example of a hardware configuration of a sound signal processing device 1000 that may be configured to implement an embodiment of present disclosure.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

<Hardware Configuration>

FIG. 1 illustrates a block diagram of a sound signal processing device 1000 that may be configured to implement a method for processing sound signals provided by an embodiment of present disclosure.

The sound signal processing device 1000 may be a speaker box with a microphone array, an earphone, a TV box, or other intelligent devices and the like with a plurality of sound reception apparatuses.

In one example, as shown in FIG. 1, the sound signal processing device 1000 may comprise a processor 1100, a memory 1200, an interface apparatus 1300, a communication apparatus 11400, a display apparatus 1500, an input apparatus 1600, a speaker 1700, a sound reception apparatus 1800, and the like. Wherein, the processor 1100 may be a central processing unit CPU, a microprocessor MCU, and the like. The memory 1200 comprises, for example, a ROM (read only memory), a RAM (random access memory), a nonvolatile memory such as a hard disk, and the like. The interface apparatus 13300 comprises, for example, a USB interface, an earphone interface, and the like. The communication apparatus 1400 can perform wired or wireless communication, for example, and can specifically comprise Will communication, Bluetooth communication, 2G/3G/4G/5G communication, and the like. The display apparatus 1500 is, for example, a liquid crystal display screen, a touch display screen, and the like. The input apparatus 1600 may comprises, for example, a touch screen, a keyboard, and motion sensing input. The speaker 1700 and the microphone 1800 can be used by a user to input/output voice information.

The sound signal processing device shown in FIG. 1 is merely illustrative and in no way means any limitation on present disclosure as well as application or use thereof. Applied to the embodiment of present disclosure, the memory 1200 of the sound signal processing device 1000 is used to store instructions, which are used to control the processor 1100 for operation to execute any method for processing sound signals provided by the embodiment of present disclosure. Those skilled in the art should understand that although a plurality of apparatuses are illustrated for the sound signal processing device 1000 in FIG. 1, only some of them may be involved in present disclosure, for example, the sound signal processing device 1000 only involving the processor 1100 and the storage apparatus 1200. Technicians can design instructions according to a scheme disclosed in present disclosure. Flow the instruction controls the operation of the processor is well known in the art, and thus will not be described in detail here.

The sound signal processing device 1000 may be a speaker box with a microphone array, an earphone, a TV box, or other intelligent devices and the like with a plurality of sound reception apparatuses.

Figure 2:
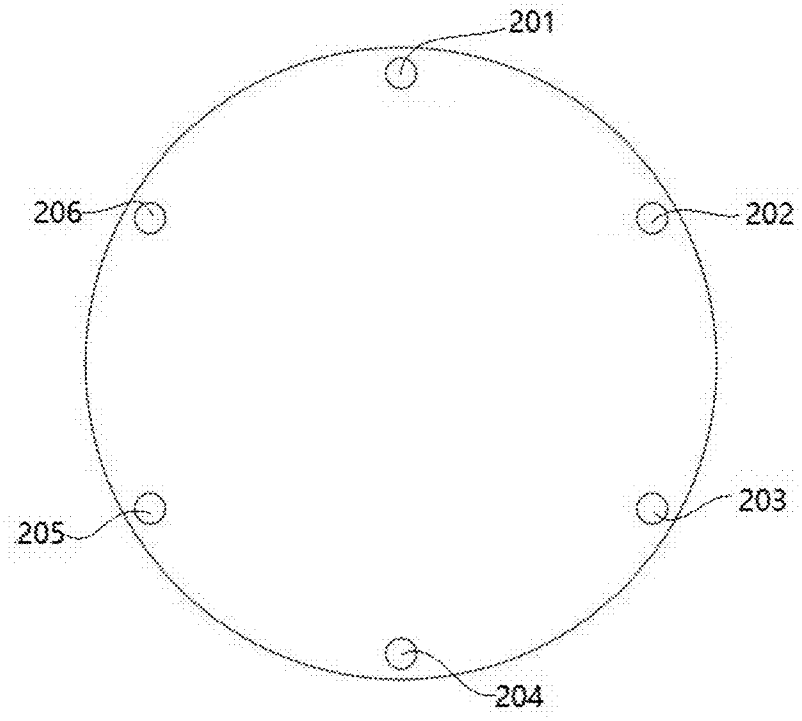
FIG. 2 is a schematic structural diagram showing a microphone array that may be configured to implement the embodiment of the application.

FIG. 2 is a schematic structural diagram illustrating a microphone array that may be configured to implement an embodiment of present disclosure.

Microphone array is an array formed by arranging a group of omni-directional microphones at different positions in space according to a certain shape rule, and is an apparatus for spatially sampling sound signals transmitted in space. The sampled signals include spatial position information thereof.

Taking the microphone array shown in FIG. 2 as an example, the microphone array is a coaxial circular array comprising six microphones. Specifically, the microphone array may comprises a first microphone 201, a second microphone 202, a third microphone 203, a fourth microphone 204, a fifth microphone 205, and a sixth microphone 206, which all are located on the same plane to form the coaxial circular array.

<Method>

Figure 3:
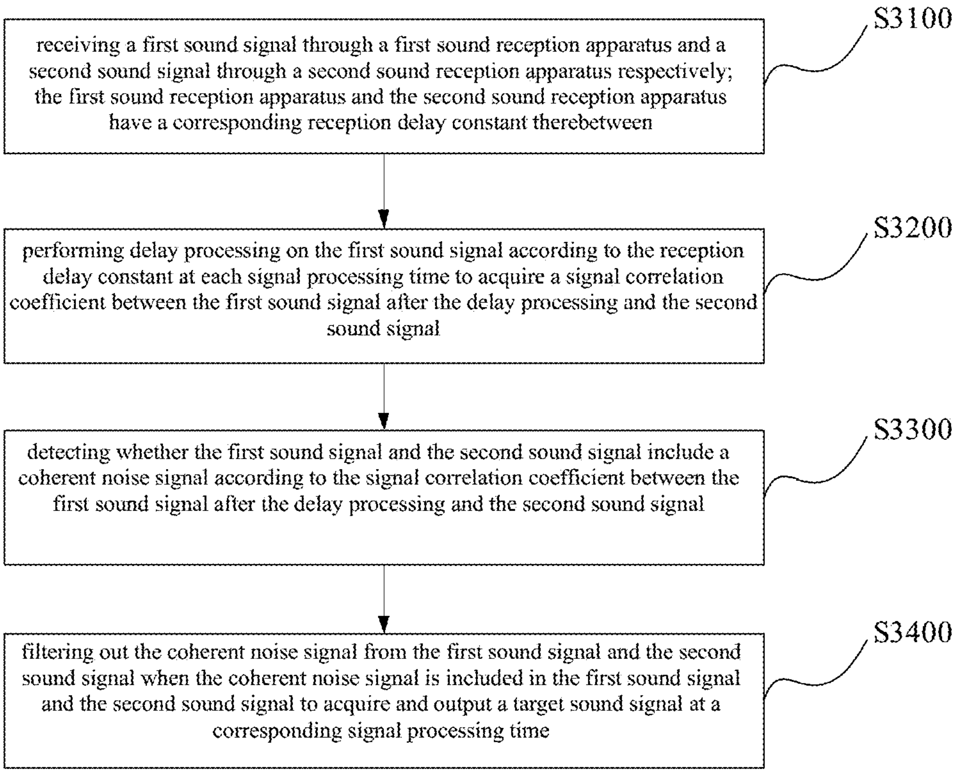
FIG. 3 is a schematic flowchart of a method for processing sound signals according to the embodiment of the application.

This embodiment provides a method for processing sound signals. As shown in FIG. 3, the method for processing sound signals may comprise the following steps S3100 to S3400.

Step S3100, receiving a first sound signal through a first sound reception apparatus and a second sound signal through a second sound reception apparatus respectively.

The first sound reception apparatus and the second sound reception apparatus are apparatus for receiving sound signals. For example, the first sound reception apparatus and the second sound reception apparatus may be microphones separately configured, or any two microphones in a microphone array composed of a plurality of microphones.

There is a corresponding reception delay constant between the first sound reception apparatus and the second sound reception apparatus. The reception delay constant is a time difference between the time when a sound signal is received by any two relatively fixed sound receiving devices when the two sound receiving devices receive the sound signal from the same sound source.

In a specific example, the reception delay constant can be determined according to a distance between two sound reception apparatuses and a speed of sound signal transmission. For example, Assuming that the distance between the first sound reception apparatus and the second sound reception apparatus is L and the speed of sound signal transmission is c, for a target sound signal sent out by a sound source located in a target direction of the two sound reception apparatuses, the time difference between the time when reaching the first sound reception apparatus and the second sound reception apparatus is L/c, and the corresponding reception delay constant T between the first sound reception apparatus and the second sound reception apparatus is L/c.

After receiving the first sound signal and the second sound signal, proceeding to:

Step S3200, performing delay processing on the first sound signal according to the reception delay constant at each signal processing time, and acquiring a signal correlation coefficient between the first sound signal after the delay processing and the second sound signal.

Signal correlation coefficient is a coefficient used to characterize correlation between signals. In this embodiment, by acquiring the signal correlation coefficient between the first sound signal after the delay processing and second sound signal, degree of signal correlation between the first sound signal after the delay processing and second sound signal can be determined.

In this embodiment, each signal processing time is the time when the sound signal processing device receives the sound signal from the target sound source. In a more specific example, a current signal processing time is t, the corresponding reception delay constant between the first sound reception apparatus and the second sound reception apparatus is T, a the first sound signal $x_1(t)$ received by the first sound reception apparatus is performed the delay processing according to T, and is obtained as the first sound signal after the delay processing which is $x_1(t+T)$. In practical applications, the first sound signal received by the first sound apparatus can be buffered, and then a first sound signal delayed by T at the current signal processing time t can be obtained.

Assuming that at the current signal processing time t, the first sound signal after the delay processing is $x_1(t+T)$ and the second sound signal is $x_2(t)$, correspondingly, the signal correlation coefficient $\mathrm{corr}(x_1(t+T), x_2(t))$ between the first sound signal after the delay processing and the second sound signal can be obtained by the following formula (1)

$$\mathrm{corr}(x_1(t+T), x_2(t)) = \frac{\mathrm{Cov}(x_1(t+T), x_2(t))}{\sqrt{\mathrm{Var}(x_1(t+T))}\sqrt{\mathrm{Var}(x_2(t))}} \tag{1}$$

Wherein, $\mathrm{Cov}(x_1(t+T), x_2(t))$ is a covariance between the first sound signal after the delay processing and the second sound signal; $\mathrm{Var}(x_1(t+T))$ represents a variance of the first sound signal received by the first sound reception apparatus after the delay processing, and $\mathrm{Var}(x_2(t))$ is a variance of the second sound signal received by the second sound reception apparatus.

After obtaining the signal correlation coefficient between the first sound signal after the delay processing and the second sound signal, proceeding to:

Step S3300, detecting whether the first sound signal and the second sound signal include a coherent noise signal, according to the signal correlation coefficient between the first sound signal after the delay processing and the second sound signal.

Next, with reference to FIGS. 4 and 5, an example will be given in which the first sound signal and the second sound signal include coherent noise signals.

Figure 4:
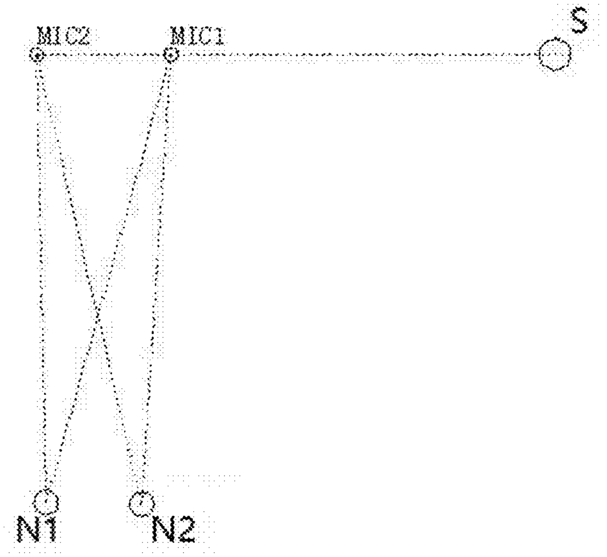
FIG. 4 is a schematic diagram of an example of a setting environment of a first sound apparatus and a second sound apparatus.

FIG. 4 illustrates a case where a microphone array is employed to receive sound signals. In FIG. 4, the microphone array comprises a microphone 1 and a microphone 2 which are used for receiving a target sound signal S sent out by a target sound source. Assuming that a distance between the microphone 1 and the microphone 2 is L and a speed of the sound wave transmission is c, for a target sound signal S sent out by a source located in a target direction of the microphone array, a time difference between the time when reaching the microphones 1 and 2 is ΔT=L/c. It can be seen that the sound signal S received by the microphone 1 and the delay ΔT have a strong correlation with the sound signal S received by the microphone 2, and by using the beamforming algorithm to extract such a strong correlation signal, it can be achieved the effects of enhancing sound signal enhancement and reducing signal noise.

In FIG. 4, there are noise signals N1 and N2 sent out by two coherent noise sources in a transmission environment, and these two noise signals N1 and N2 are sound signals with time difference ΔT respectively sent out through two-channel devices by the same sound source.

Figure 5:
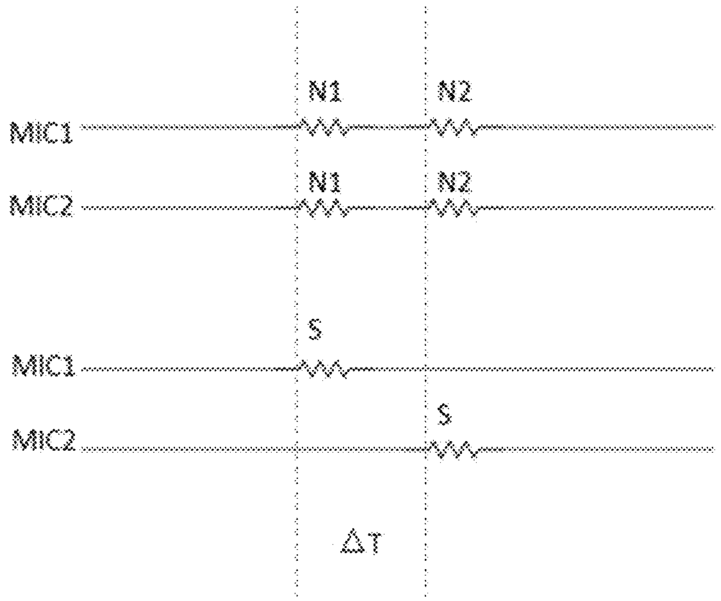
FIG. 5 is a schematic diagram of an example in which a first sound apparatus and a second sound apparatus receive sound signals.

FIG. 5 illustrates sound signals received by the microphones 1 and 2. In FIG. 5, there will be a delay ΔT when the noise signals N1 and N2 arrive at the microphone 1, and there will be a delay ΔT when the noise signals N1 and N2 arrive at the microphone 2. Because the noise signals N1 and N2 themselves have a strong correlation and the time difference between N1 and N2 is close to the time difference between the time when the target sound signals S reach the microphones 1 and 2, the noise signals N1 and N2 when processed by the beamforming algorithm will be mistaken for the target sound signals S. The noise signals N1 and N2 are coherent noise signals for sound signals received by the microphones 1 and 2.

This embodiment directs at the above cases, for two-way sound signals received by two sound reception apparatuses respectively, the delay processing can be performed on one-way sound signal according to the reception delay constant between the two sound reception apparatuses, and with the signal correlation coefficient between the sound signal after the delay processing and the other sound signal, it can be detected whether the two-way sound signals include a coherent noise signal, avoiding mistaking the coherent noise signal for the target sound signal when performing the beamforming processing on two-way sound signals, affecting noise reduction effect and sound enhancement effect that can be obtained in the sound signal processing process (for example, the beamforming processing), and improving sound signal processing performance.

In a more specific example, the step S3300 where detecting whether the first sound signal and the second sound signal include the coherent noise signal according to the signal correlation coefficient between the first sound signal after the delay processing and the second sound signal may comprises the following steps: S3310-S3330.

Step S3310, setting a detection delay set according to the reception delay constant when the signal correlation coefficient between the first sound signal after the delay processing and the second sound signal is greater than a correlation coefficient threshold.

In this embodiment, the correlation coefficient threshold is used as a threshold for judging whether there is a strong correlation between the first sound signal after the delay processing and the second sound signal. The correlation coefficient threshold can be set according to engineering experience or experimental simulation results, for example, the correlation coefficient threshold is set to 0.5.

By setting the correlation coefficient threshold, it can be judged whether there is strong correlation between the first sound signal after the delay processing and the second sound signal. If there is strong correlation between them, the coherent noise signal is detected in combination with subsequent steps, avoiding redundant detection of the coherent noise signal and reducing processing efficiency.

In this example, the step of setting the detection delay set according to the reception delay constant may comprise steps S3311-S3312.

Step S3311, a detection delay upper limit value and a detection delay lower limit value are determined according to the reception delay constant.

In this embodiment, the detection delay upper limit value is the maximum limit threshold of the detection delay used for the delay processing of the first sound signal. The detection delay lower limit value is the minimum limit threshold of the detection delay used for the delay processing of the first sound signal.

Setting the detection delay set in the step S3310 may comprise a step S3312*a*.

Step S3312*a*, setting each detection delay in the detection delay set to be not less than the detection delay lower limit value but not more than the detection delay upper limit value.

For example, Assuming that the reception delay constant between the first sound reception apparatus and the second sound reception apparatus is T, the detection delay upper limit value is set as T, and the detection delay lower limit value is set as −T, then the detection delay set can be set as [−T, T].

By setting the detection delay set, it can limit a signal processing range of the coherent noise signals by the delay processing on the first sound signal, avoid implementation of redundant signal processing and effectively improve processing efficiency. Meanwhile, by setting the detection delay set according to the reception delay constant, it can accurately limit a detection range of the coherent noise signals and quickly detect coherent noise signals.

Or, setting the detection delay set in the step S3310 may comprise a step S3312*b*.

Step S3312*b*, setting each detection delay in the detection delay set to be not less than the detection delay lower limit value but less than the detection delay upper limit value.

In this embodiment, Assuming that the reception delay constant between the first sound reception apparatus and the second sound reception apparatus is T, the detection delay upper limit value is set as T, and the detection delay lower limit value is set as −T, then the detection delay set can be set as [−T, T].

By setting the detection delay in the detection delay set not comprise the reception delay constant T, it can avoid repeatedly performing delay processing on the first sound signal according to the reception delay constant T, further reduce the signal processing range, avoid the redundant signal processing, and effectively improve the processing efficiency.

Step S3320, performing the delay processing on the first sound signal according to the detection delay set to acquire a coherent detection coefficient set between the first sound signal after the delay processing and the second sound signal.

The coherent detection coefficient set comprises coherent detection coefficients respectively corresponding to each detection delay in the detection delay set. The coherent detection coefficients are used to characterize degree to which the first sound signal after the delay processing and the second sound signal embody coherent noise signal according to the corresponding detection delay.

In this embodiment, the step S3320 where performing the delay processing on the first sound signal according to the detection delay set to acquire a coherent detection coefficient set between the first sound signal after the delay processing and the second sound signal may comprise steps S3321-S3322.

Step S3321, performing the delay processing on the first sound signal based on a current signal processing time according to each detection delay in the detection delay set respectively to acquire the first sound signal after the delay processing and corresponding to the detection delay.

Step S3322, acquiring a signal correlation coefficient between the first sound signal after the delay processing and corresponding to the detection delay and the second sound signal at the current signal processing time as the coherent detection coefficient corresponding to the detection delay.

In a more specific example, taking the detection delay set[−T, T] as an example, assuming that the current signal processing time is t and the detection delay is $\tau$, $\tau \in [-T, T]$, then the signal correlation coefficient between the first sound signal $x_1(t+\tau)$ after the delay processing and corresponding to the detection delay and the second sound signal $x_2(t)$ at the current signal processing time can be acquired by the following formula (2):

$$\mathrm{corr}(x_1(t+\tau), x_2(t)) = \frac{\mathrm{Cov}(x_1(t+\tau), x_2(t))}{\sqrt{\mathrm{Var}(x_1(t+\tau))}\sqrt{\mathrm{Var}(x_2(t))}} \tag{2}$$

wherein, $\mathrm{Cov}(x_1(t+\tau), x_2(t))$ is a covariance between the second sound signal and the first sound signal after the delay processing acquired by performing the delay processing thereon according to the detection delay $\tau$, $\mathrm{Var}(x_1(t+\tau))$ represents a variance of the first sound signal after delayed $\tau$ processing based on the current signal processing time t, and $\mathrm{Var}(x_2(t))$ is a variance of the second sound signal.

The signal correlation coefficient is used to characterize the correlation between signals. Taking the signal correlation coefficient between the first sound signal after the delay processing and corresponding to the detection delay and the second sound signal at the current signal processing time as the coherent detection coefficient corresponding to the detection delay, it can use the signal correlation between the first sound signal after the delay processing and corresponding to the detection delay and the second sound signal at the current signal processing time to characterize degree to which the first sound signal after the delay processing and the second sound signal embody the coherent noise signal, and based on the coherence detection coefficient, it can detect the coherent noise signal more accurately.

Step S3330, determining that the first sound signal and the second sound signal include a coherent noise signal when there is a coherent detection coefficient larger than the signal correlation coefficient in the coherent detection coefficient set.

The signal correlation coefficient here embodies, the signal correlation between the second sound signal and the first sound signal after the delay processing according to the reception delay constant, and it is larger than the correlation coefficient threshold, which means that the first sound signal after the delay processing according to the reception delay constant and the second sound signal have a strong correlation and the former is most likely to be the sound signal sent out by the target sound source.

However, there is a coherent detection coefficient larger than the signal correlation coefficient in the coherent detection coefficient set, which means that there is a stronger signal correlation between the first sound signal delay processed according to the corresponding detection delay and the second sound signal, which is inconsistent with expectation that the signal correlation between the first sound signal after the delay processing according to the reception delay constant and the second sound signal is strongest when there is no coherent noise source in the signal transmission environment. It means that there are noise sources in the signal transmission environment and coherent noise signals are sent out.

By detecting that there is a coherent detection coefficient larger than the signal correlation coefficient in the coherent detection coefficient set to determine that the first sound signal and the second sound signal include coherent noise signals therein, it can accurately detect existence of the coherent noise signal and avoid mistaking the coherent noise signal for the desired received target sound signals for processing and affecting processing performance of sound signals.

In this example, after determining whether the first sound signal and the second sound signal include a coherent noise signal therein by acquiring the coherent detection set, it may further comprise a step of acquiring the coherent noise signal when the first sound signal and the second sound signal include coherent noise signal therein, comprising S3340-S3350.

Step S3340, determining the detection delay corresponding to the coherent detection coefficient with the largest value in the coherent detection coefficient set as a target detection delay.

Assuming that the detection delay set is set as [−T, T] according to the reception delay constant T, then the detection delay $\tau$ is selected within [−T, T] to acquire the corresponding coherent detection coefficient set, and if the detection delay $\tau$ corresponding to the coherent detection coefficient with the largest value in the coherent detection coefficient set is $t_0$, it is determined that the target detection delay is $t_0$. At this time, the coherent detection coefficient between the first sound signal $x_1(t+t_0)$ delay processed according to the detection delay and the second sound signal $x_2(t)$ is largest, and is larger than the signal correlation coefficient between the first sound signal $x_1(t+T)$ delay processed according to the reception delay constant and the second sound signal $x_2(t)$, which means that the coherent noise signal is not only comprised in the first sound signal and the second sound signal, but also has the highest signal strength when the time difference between the time when there is the coherent noise signal in the first sound signal and the second sound signal is $\tau=t_0$.

Step S3350, according to the target detection delay, performing delay processing on the first sound signal based on the current signal processing time, and performing a combining and averaging processing on the first signal after the delay processing and the second sound signal at the current signal processing time, so as to acquire the coherent noise signal at the current signal processing time.

Assuming that the target detection delay is determined to be $t_0$, the coherent noise signal at the current signal processing time, acquired by performing the combining and averaging processing on the first signal after the delay processing and the second sound signal at the current signal processing time, can be $(x_1(t+t_0)+x_2(t))/2$.

After determining that the first sound signal and the second sound signal include relevant noise signals based on the acquired coherent detection coefficient set, by determining the detection delay with the largest coherent detection coefficient as the target detection delay, it can accurately locate and acquire the coherent noise signals, so as to filter out the coherent noise signals included in the first sound signal and the second sound signal in combination with subsequent steps and improve processing performance of the sound signals.

After determining whether the first sound signal and the second sound signal include coherent noise signals according to the above steps, proceeding to:

Step S3400, filtering out the coherent noise signals from the first sound signal and the second sound signal when the coherent noise signals are included in the first sound signal and the second sound signal, and acquiring and outputting a target sound signal at a corresponding signal processing time.

By filtering out the coherent noise signals, it can be avoided that the coherent noise signals are mistaken for the target noise signals, which affects the noise reduction effect and sound enhancement effect that can be acquired in the sound signal processing process (for example the beamforming processing), and can improve the sound signal processing performance.

In a more specific example, the step S3400 may comprises steps S3410*a*~S3420*a*.

Step S3410*a*, performing the beamforming processing on the first sound signal and the second sound signal based on the current signal processing time to acquire a preprocessed sound signal.

In this example, the beamforming algorithm is an algorithm used in sound signal processing, is mainly based on the stability of the sound wave transmission speed and the immobility of the relative distance between the sound reception apparatuses, and with the use of the time difference and phase difference when the sound signal is transmitted to the two sound reception apparatuses respectively, extracts the more correlated parts of the sound signal received by the two sound reception apparatuses for merging processing, which can realize the effect of sound signal enhancement as well as reducing the signal noise.

Assuming that the current signal processing time is t, the first sound signal is $x_1(t)$, the second sound signal is $x_2(t)$, and the reception delay constant between the first sound reception apparatuses and the second sound reception apparatuses is T, the preprocessed signal $X(T)=(x_1(t+T)+x_2(t))/2$ can be obtained by the beamforming processing.

Step S3420*a*, filtering out the coherent noise signals at the current signal processing time from the preprocessed sound signal so as to obtain the target sound signal.

In this example, by performing the processing of filtering out the coherent noise on the preprocessed signal obtained from the first sound signal and the second sound signal after the beamforming processing, it can eliminate the coherent noise signals mistaken for the target sound signal during the beamforming processing, and ensure the noise reduction and enhancement effect of the sound signal.

In this example, the step of filtering out the coherent noise signals at the current signal processing time from the preprocessing sound signal may comprise steps S3401-S3402.

Step S3401, subtracting a time domain signal corresponding to the coherent noise signal from a time domain signal corresponding to the preprocessed sound signal.

Assuming that the current signal processing time is t and the target detection delay is $t_0$, the first signal $x_1(t+t_0)$ after the delay processing and the second sound signal at the current signal processing time are combined and averaged in the time domain, so as to obtain the coherent noise signal at the current signal processing time to be filtered out as $(x_1(t+t_0)+x_2(t)/2$; based on the current signal processing time t, performing the beamforming processing on the first sound signal and the second sound signal to obtain a preprocessed sound signal $x_1(t+t_0)$; in the preprocessed sound signal X(T), subtracting the coherent noise signal$(x_1(t+t_0)+x_2(t))/2$ at the current signal processing time to obtain the target sound signal.

By subtracting the coherent noise signals from the preprocessed signal in the time domain, it can filter out the coherent noise signals in the time domain, be easy to be implemented and can effectively guarantee the processing performance of sound signals.

Or, in this example, the step of filtering out the coherent noise signals at the current signal processing time from the preprocessed sound signal may comprise:

Step S3402, filtering out a frequency domain signal with the same spectrum as the coherent noise signal from a frequency domain signal corresponding to the preprocessed sound signal.

On the frequency domain, by filtering out the frequency domain signal with the same spectrum as the coherent noise signal in the preprocessed signal, it can achieve filtering out the coherent noise signal from the frequency, be easy to be implemented and can effectively guarantee the processing performance of the sound signal.

In a practical application, as to filtering out the frequency domain signal with the same spectrum as the coherent noise signal from the frequency domain signal of the preprocessed signal, it can be achieved by designing a filter with the same spectrum shape as the coherent noise signal and processing the preprocessed signal with the filter.

It should be understood that, in the practical application, those skilled in the art can choose to filter out the coherent noise signals through step S3401 or S3402 according to specific application scenarios or application requirements.

In the other example, the step S3400 may comprises steps S3410*a*~S3420*b*.

Step S3410*b*, taking the first sound signal and the second sound signal as one-way preprocessed sound signal respectively, and filtering out the coherent noise signals at the current signal processing time from the preprocessed sound signal so as to obtain the first sound signal and the second sound signal with the coherent noise filtered.

In particularly, the step of filtering out the coherent noise signals at the current signal processing time from the preprocessing sound signal, can be carried out in the same way as the above step S3401 or S3402, which will not be repeated here.

Step S3420*b*, obtaining the target sound signal after performing the beamforming processing on the first sound signal and the second sound signal with the coherent noise filtered, based on the current signal processing time.

The specific implementation of the beamforming processing can be the same as that described above, and will not be repeated here.

In this example, by filtering out the coherent noise signals and performing the beamforming processing on the first sound signal and the second sound signal used as preprocessing signals respectively, it can ensure that the coherent noise signals are not introduced during the beamforming processing, cannot affect a existing beamforming processing flow, and can effectively ensure the processing efficiency of sound signals while improving the processing performance of sound signals.

<Example>

Figure 6:
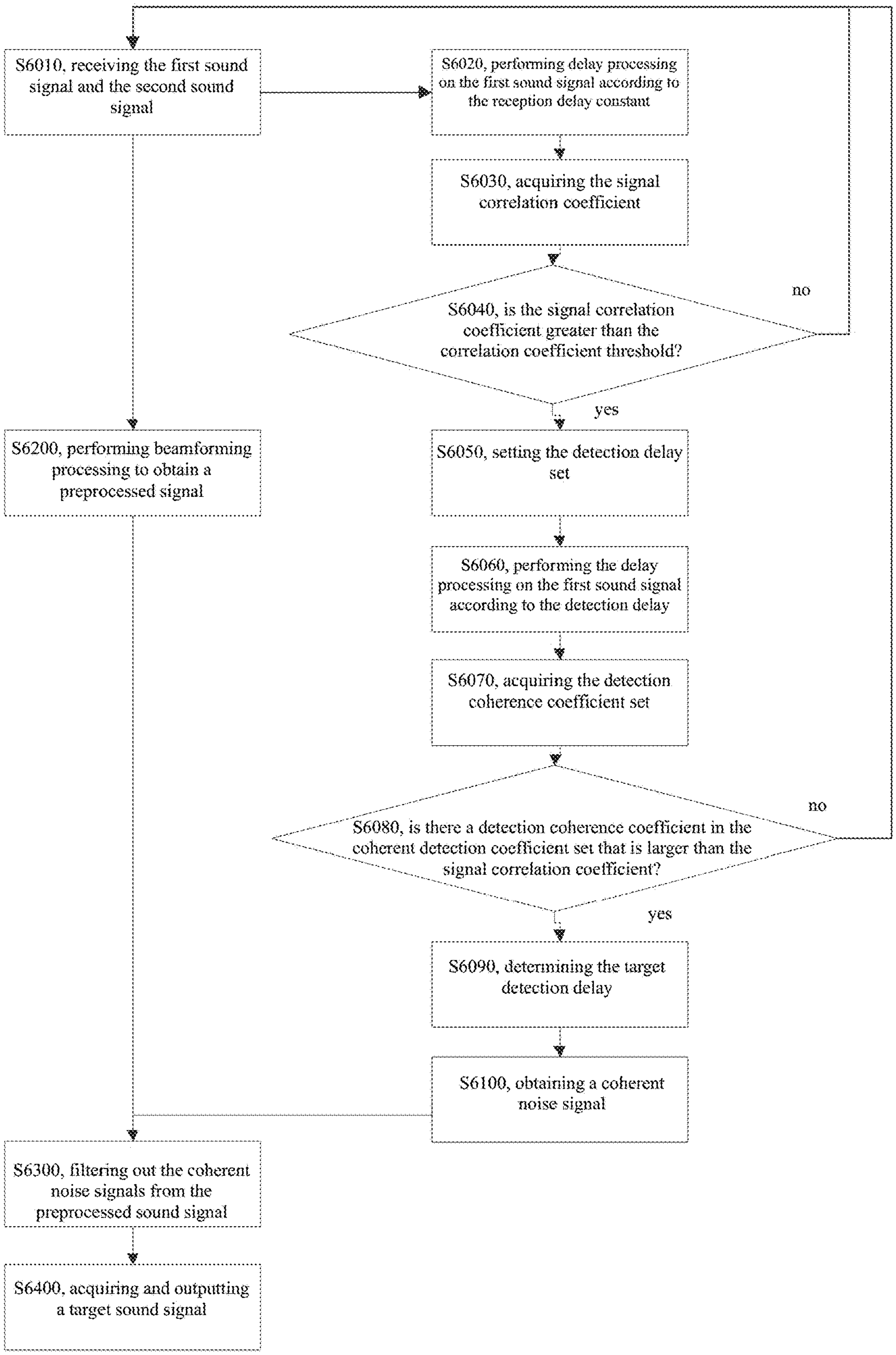
FIG. 6 is a schematic flowchart of a method for processing sound signals according to one example of the application.

The method for processing sound signals provided in this embodiment will be further explained with reference to FIG. 6.

In this example, the first sound reception apparatuses and the second sound reception apparatuses are microphones 1 and 2 in the microphone array shown in FIG. 4, and the reception delay constant between the microphone 1 and the microphone 2 is T. In the transmission environment, there are also coherent noise signals N1 and N2 sent out from two coherent noise sources, and the time difference between the time when the noise signals from the coherent noise sources arriving at the microphones 1 and 2 is as shown in FIG. 5, which is close to the reception delay constant T, and the noise signals are easily mistaken for the target sound signal.

The method for processing sound signals may comprise the following steps: steps S6010-step S6400.

Step S6010, receiving the first sound signal $x_1(t)$ and the second sound signal $x_2(t)$ through the microphone 1 and the microphone 2 at the current signal processing time t.

Step S6020, performing the delay processing on the first sound signal $x_1(t)$ according to the received delay constant T to obtain the first sound signal $x_1(t+T)$ after the delay processing.

Step S6030, acquiring the signal correlation coefficient $corr(x_1(t+T), x_2(t))$ between the first sound signal after the delay processing $x_1(t+T)$ and the second sound signal $x_2(t)$.

Step S6040, judging whether the signal correlation coefficient $corr(x_1(t+T), x_2(t))$ is greater than the correlation coefficient threshold, executing a step S6050 if the signal correlation coefficient $corr(x_1(t+T), x_2(t))$ is greater than the correlation coefficient threshold; and otherwise, waiting for re-execting a step S6010 at the next signal processing time.

Step S6050, setting the detection delay set as [−T, T], according to the reception delay constant T.

Step S6060, performing delay processing on the first sound signal based on the current signal processing, time t according to each of the detection delay $\tau$ in the detection delay set respectively to acquire the first sound signal after the delay processing $x_1(t+\tau)$.

Step S6070, acquiring the signal correlation coefficient $corr(x_1(t+\tau), x_2(t))$ between the first sound signal $x_1(t+\tau)$ after the delay processing and corresponding to each detection delay $\tau$ respectively, and the second sound signal $x_2(t)$ at the current signal processing time, as the coherent detection coefficient corresponding to the detection delay, thereby acquiring a coherent detection coefficient set comprising the coherent detection coefficient corresponding to each detection delay.

Step S6080, judging whether there is a correlation detection coefficient larger than the signal correlation coefficient in the correlation detection coefficient set, executing a step S6090 if there is a correlation detection coefficient larger than the signal correlation coefficient in the correlation detection coefficient set, and otherwise, waiting for re-executing a step S6010 at the next signal processing time.

Step S6090, determining the detection delay corresponding to the coherent detection coefficient with a largest value in the coherent detection coefficient set as a target detection delay.

Step S6100, performing delay processing on the first sound signal according to the target detection delay based on a current signal processing time, performing a combining and averaging processing on the first signal after the delay processing and the second sound signal at the current signal processing time, so as to acquire the coherent noise signal at the current signal processing time, and proceeding to a step S6300.

Step S6200, performing the beamforming processing on the first sound signal and the second sound signal to obtain a preprocessed signal.

Step S6300, filtering out the coherent noise signal from the preprocessed sound signal.

Step S6400, obtaining and outputting a target sound signal.

In this example, in view of the case where there are two coherent noise signals N1 and N2 in the reception range of microphone array, for two-way sound signals received by two microphones respectively, it can perform delay processing on one-way sound signal according to the reception delay constant between the two microphones, and it can detect whether the two-way sound signals include coherent noise signals with the signal correlation coefficient between the sound signals after the delay processing anti the other-way sound signal, avoid mistaking the coherent noise signals for the target sound signal when performing the beamforming processing on two-way sound signals and affecting the noise reduction effect and sound enhancement effect that can be obtained in the sound signal processing process (for example, the beamforming processing), and improve the sound signal processing performance.

<Sound Signal Processing Apparatus>

Figure 7:
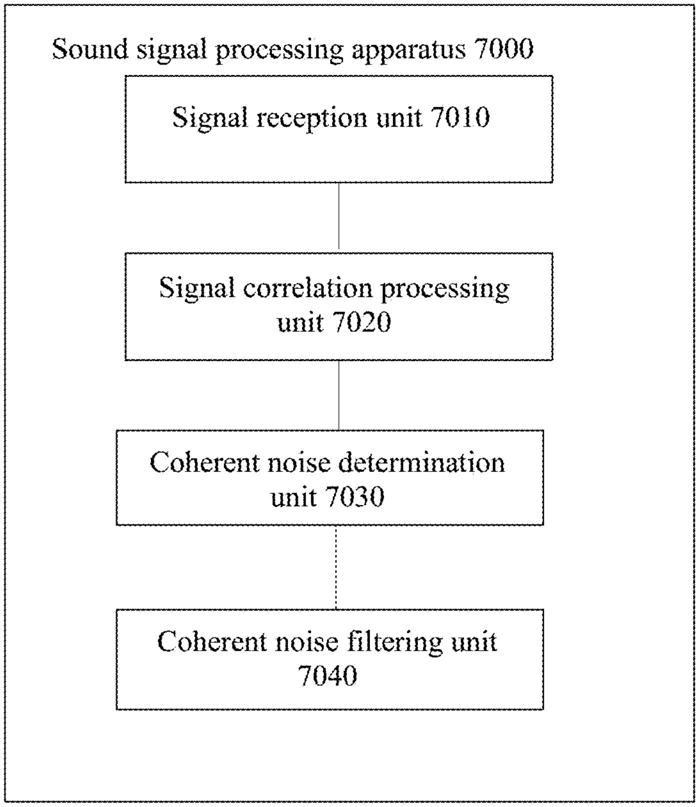
FIG. 7 is a schematic structural diagram of hardware of a sound signal processing apparatus 7000 according to an embodiment of the application.

In this embodiment, a sound signal processing apparatus 7000 is also provided, as shown in FIG. 7. The sound signal processing apparatus 7000 may comprise a signal reception unit 7010, a signal correlation processing unit 7020, a coherent noise determining unit 7030, and a coherent noise filtering unit 7040, which are used to implement the method for processing sound signals provided in this embodiment, and will not be described in detail here.

The signal reception unit 7010 may be configured to receive a first sound signal through a first sound reception apparatus and a second sound signal through a second sound reception apparatus respectively, the first sound reception apparatus and the second sound reception apparatus have a corresponding reception delay constant therebetween.

The signal correlation processing unit 7020 may be configured to perform delay processing on the first sound signal according to the reception delay constant at each signal processing time and acquire a signal correlation coefficient between the first sound signal after the delay processing and the second sound signal.

The coherent noise determination unit 7030 may be configured to determine whether the first sound signal and the second sound signal include a coherent noise signal according to the signal correlation coefficient between the first sound signal after the delay processing and the second sound signal.

In one embodiment of present disclosure, the coherent noise determination unit 7030 may comprise a detection delay set determination subunit 7031, a coherent detection coefficient set acquisition subunit 7032, and a coherent noise determination unit subunit 7033.

The detection delay set determination subunit 7031 may be configured to set the detection delay set according to the reception delay constant when the signal correlation coefficient between the first sound signal after the delay processing and the second sound signal is greater than a correlation coefficient threshold.

The coherence detection coefficient set acquisition subunit 7032 may be configured to perform delay processing on the first sound signal according to the detection delay set to acquire a coherent detection coefficient set between the first sound signal after the delay processing and the second sound signal; the coherent detection coefficient set includes coherent detection coefficients therein respectively corresponding to each detection delay in the detection delay set.

In one embodiment of present disclosure, the coherent detection coefficient set acquisition subunit 7032 may comprise a delay processing subunit and a coherent detection coefficient determination unit.

The delay processing subunit may be configured to perform delay processing on the first sound signal based on a current signal processing time according to each detection delay in the detection delay set respectively to acquire the first sound signal after the delay processing and corresponding to the detection delay.

The coherent detection coefficient determination unit may be configured to acquire a signal correlation coefficient between the first sound signal after the delay processing and corresponding to the detection delay and the second sound signal at the current signal processing time as the coherent detection coefficient corresponding to the detection delay.

The coherent noise determination unit subunit 7033 may be configured to determine that the first sound signal and the second sound signal include a coherent noise signal when a coherent detection coefficient larger than the signal correlation coefficient exists in the coherent detection coefficient set.

In one embodiment of present disclosure, the coherent noise determination unit 7030 may further comprise a coherent noise acquisition subunit 7034. The coherent noise acquisition subunit 7034 may be configured to determine the detection delay corresponding to the coherent detection coefficient with the largest value in the coherent detection coefficient set as the target detection delay, perform delay processing on the first sound signal based on a current signal processing time according to the target detection delay, and perform a combining and averaging processing on the first signal after the delay processing and the second sound signal at the current signal processing time, so as to acquire the coherent noise signal at the current signal processing time.

The coherent noise filtering unit 7040 may be configured to filter out a coherent noise signal from the first sound signal and the second sound signal when the coherent noise signal is included in the first sound signal and the second sound signal, and thus acquire and output a target sound signal at a corresponding signal processing time.

In one embodiment of present disclosure, the coherent noise filtering unit 7040 may further comprise a waveform processing subunit 7041 and a filtering out subunit 7042.

The waveform processing subunit 7041 may be configured to perform the beamforming processing on the first sound signal and the second sound signal based on the current signal processing time to acquire a preprocessed sound signal.

The filtering out subunit 7042 may be configured to filter out the coherent noise signal at the current signal processing time from the preprocessed sound signal to obtain the target sound signal.

It should be understood by those skilled in the art that the sound signal processing apparatus 7000 can be implemented in various ways. For example, the sound signal processing apparatus 7000 can be achieved by configuring a processor with instructions. For example, the sound signal processing apparatus 7000 can be achieved by storing instructions in a ROM and reading the instructions from the ROM into a programmable device when the device is started. For example, the sound signal processing apparatus 7000 may be solidified into a dedicated device (for example, an ASIC). The sound signal processing apparatus 7000 can be divided into independent units, or combining the independent units together to achieve the sound signal processing apparatus 7000 can be achieved by one of the above-mentioned various implementations, or can be achieved by the combination of two or more of the above-mentioned various implementations.

Figure 8:
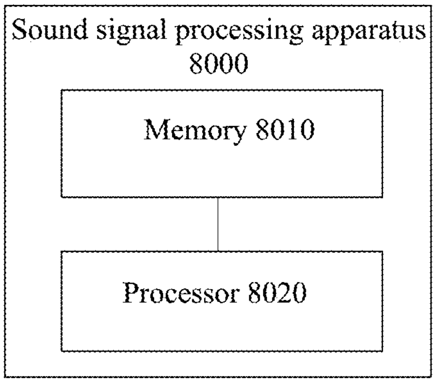
FIG. 8 is a block diagram of an example of a hardware configuration of a sound signal processing apparatus 8000 according to an embodiment of the application.

In this embodiment, another sound signal processing apparatus 8000 is also provided, as shown in FIG. 8, which comprises:

a memory 8010 configured to store executable instructions;

a processor 8020 configured to, according to control of the executable instructions, operate the sound signal processing device to execute the method for processing sound signals provided in this embodiment.

In this embodiment, the sound signal processing apparatus 8000 may be a speaker box with a microphone array, an earphone, a TV box, or a module with sound signal processing function in other intelligent equipment and the like with a plurality of sound reception apparatuses.

<Sound Signal Processing Device>

In this embodiment, a sound signal processing device 9000 is also provided, and the sound signal processing device 9000 comprises:

- a first sound reception apparatus 9010 configured to receive a sound signal;
- a second sound reception apparatus 9020 configured to receive a sound signal the first sound reception apparatus and the second sound reception apparatus have a corresponding reception delay constant therebetween;
- the sound signal processing apparatus 7000 or the sound signal processing apparatus 8000 is provided by this embodiment.

The sound signal processing apparatus 7000 can be shown in FIG. 7, and the sound signal processing apparatus 8000 can be shown in FIG. 8, which will not be described in detail herein.

In this embodiment, the sound signal processing device 9000 may be a speaker box with a microphone array, an earphone, a TV box, or other intelligent devices and the like with a plurality of sound reception apparatuses. The first sound reception apparatus 9010 and the second sound reception apparatus 9020 may be microphones 1 and 2 in a microphone array. In this embodiment, the corresponding method for processing sound signals can be implemented by the sound signal processing device 9000, which is not repeated herein.

The method, apparatus and device for processing sound signals provided in this embodiment have been described above with reference to the drawings and examples. For two-way sound signals received by two sound reception apparatuses respectively, it can perform delay processing on one-way sound signal according to the reception delay constant between the two sound reception apparatuses, and detect whether the two-way sound signals include coherent noise signals with a signal correlation coefficient between the sound signal after the delay processing and the other-way sound signal, so as to correspondingly eliminate the coherent noise signals included in the two-way sound signals, avoid mistaking the coherent noise signals for target sound signals when performing beamforming processing on two-way sound signals and affecting noise reduction effect and sound enhancement effect that can be obtained during the sound signal processing (for example, the beamforming processing), and improve the sound signal processing performance.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, comprising an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer for example, through the Internet using an Internet Service Provider). In some embodiments, electronic circuitry comprising, for example, programmable logic circuitry; field-programmable gate arrays (FPGA), or programmable logic arrays (PLA) may execute the computer readable program instructions by utilizing state information of the computer readable program instructions to personalize the electronic circuitry; in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality; and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled. In the art that the implementations of using hardware, using software or using the combination of software and hardware can be equivalent.

Embodiments of the present disclosure have been presented for purposes of illustration, but are not intended to be exhaustive or limited to the embodiments disclosed. Numerous modifications and changes will be apparent to those skilled in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the appended claims.

The invention claimed is:

1. A method for processing sound signals from first sound reception apparatus and second sound reception apparatus, the first sound reception apparatus and the second sound reception apparatus having a corresponding reception delay constant therebetween, comprising:

receiving the first sound signal through the first sound reception apparatus and the second sound signal through a second sound reception apparatus;

performing delay processing on the first sound signal according to the reception delay constant at each of a plurality of signal processing times to acquire a signal correlation coefficient between the first sound signal after the delay processing and the second sound signal;

detecting whether the first sound signal and the second sound signal include a coherent noise signal according to the signal correlation coefficient between the first sound signal after the delay processing and the second sound signal;

filtering the coherent noise signal from the first sound signal and the second sound signal when the coherent noise signal is included in the first sound signal and the second sound signal, to acquire and output a target sound signal at a corresponding signal processing time;

wherein the detecting whether the first sound signal and the second sound signal include a coherent noise signal according to the signal correlation coefficient between the first sound signal after the delay processing and the second sound signal comprises:

setting a detection delay set according to the reception delay constant when the signal correlation coefficient between the first sound signal after the delay processing and the second sound signal is greater than a correlation coefficient threshold;

performing delay processing on the first sound signal according to the detection delay set to acquire a coherent detection coefficient set between the first sound signal after the delay processing and the second sound signal; the coherent detection coefficient set includes coherent detection coefficients respectively corresponding to each detection delay in the detection delay set;

determining that the first sound signal and the second sound signal include a coherent noise signal when the coherent detection coefficient larger than the signal correlation coefficient exists in the coherent detection coefficient set.

2. The method according to claim 1, wherein the performing delay processing on the first sound signal according to the detection delay set to acquire a coherent detection coefficient set between the first sound signal after the delay processing and the second sound signal comprises:

performing delay processing on the first sound signal based on a current signal processing time according to each detection delay in the detection delay set respectively to acquire the first sound signal after the delay processing and corresponding to the detection delay;

acquiring a signal correlation coefficient between the first sound signal after the delay processing and corresponding to the detection delay and the second sound signal at the current signal processing time, as the coherent detection coefficient corresponding to the detection delay.

3. The method according to claim 1, wherein the method further comprises acquiring the coherent noise signal when the first sound signal and the second sound signal include the coherent noise signal, comprising:

determining the detection delay corresponding to the coherent detection coefficient with the largest value in the coherent detection coefficient set as a target detection delay:

according to the target detection delay, performing delay processing on the first sound signal based on a current signal processing time, and performing a combining and averaging processing on the first signal after the delay processing and the second sound signal at the current signal processing time to acquire the coherent noise signal at the current signal processing time.

4. The method according to claim 1, wherein the filtering the coherent noise signal from the first sound signal and the second sound signal when the coherent noise signal is determined to be included in the first sound signal and the second sound signal to acquire and output a target sound signal at a corresponding signal processing time comprises:

performing beamforming processing on the first sound signal and the second sound signal based on the current signal processing time to acquire a preprocessed sound signal;

filtering out the coherent noise signal at the current signal processing time from the preprocessed sound signal to obtain the target sound signal.

5. The method according to claim 4, wherein the filtering the coherent noise signal at the current signal processing time from the sound signal to be denoised comprises:

subtracting a time domain signal corresponding to the coherent noise signal from a time domain signal corresponding to the preprocessed sound signal;

or, filtering out a frequency domain signal with the same spectrum as the coherent noise signal from a frequency domain signal corresponding to the preprocessed sound signal.

6. The method according to claim 1, wherein the filtering the coherent noise signal from the first sound signal and the second sound signal when the coherent noise signal is determined to be included in the first sound signal and the second sound signal to acquire and output a target sound signal at a corresponding signal processing time comprises:

taking the first sound signal and the second sound signal as one-way preprocessed sound signal respectively, and filtering out the coherent noise signal at the current signal processing time from the preprocessed sound signal to obtain the first sound signal and the second sound signal with coherent noise filtered;

performing beamforming processing on the first sound signal and the second sound signal with coherent noise filtered based on the current signal processing time to obtain the target sound signal.

7. A sound signal processing apparatus, comprising a memory and a processor, the memory is configured to store executable instructions, and the processor is configured to, under control of the executable instructions, operate the sound signal processing apparatus to execute the method for processing sound signals of claim 1.

8. A sound signal processing apparatus, comprising:

a signal reception unit configured to receive a first sound signal through a first sound reception apparatus and receive a second sound signal through a second sound reception apparatus respectively; the first sound reception apparatus and the second sound reception apparatus have a corresponding reception delay constant therebetween;

a signal correlation processing unit configured to perform delay processing on the first sound signal at each of a plurality of signal processing times according to the reception delay constant to acquire a signal correlation coefficient between the first sound signal after the delay processing and the second sound signal;

a coherent noise determination unit configured to determine whether the first sound signal and the second sound signal include a coherent noise signal according to the signal correlation coefficient between the first sound signal after the delay processing and the second sound signal;

a coherent noise filtering unit configured to filter out a coherent noise signal from the first sound signal and the second sound signal when determining that the coherent noise signal is included in the first sound signal and the second sound signal to acquire and output a target sound signal at a corresponding signal processing time;

the coherent noise determination unit comprises a detection delay set determination subunit, a coherent detection coefficient set acquisition subunit, and a coherent noise determination unit subunit;

wherein the detection delay set determination subunit is configured to set a detection delay set according to the reception delay constant when the signal correlation coefficient between the first sound signal after the delay processing and the second sound signal is greater than a correlation coefficient threshold;

the coherent detection coefficient set acquisition subunit is configured to perform delay processing on the first sound signal according to the detection delay set to acquire a coherent detection coefficient set between the first sound signal after the delay processing and the second sound signal;

the coherent detection coefficient set includes coherent detection coefficients respectively corresponding to each detection delay in the detection delay set;

the coherent noise determination unit subunit is configured to determine that the first sound signal and the second sound signal include a coherent noise signal when the coherent detection coefficient larger than the signal correlation coefficient exists in the coherent detection coefficient set.

9. A sound signal processing device, comprising:

a first sound reception apparatus configured to receive a sound signal;

a second sound reception apparatus configured to receive a sound signal; the first sound reception apparatus and the second sound reception apparatus have a corresponding reception delay constant therebetween;

and the sound signal processing apparatus of claim 8.

* * * * *